US006141735A

United States Patent [19]

Elkhoury et al.

[11] Patent Number: 6,141,735

[45] Date of Patent: Oct. 31, 2000

[54] PERFORMING A MEMORY ACCESS CYCLE IN A MULTI-PROCESSOR COMPUTER SYSTEM

[76] Inventors: Bassam N. Elkhoury, 2232 Creekside Dr., Longmont, Colo. 80501; Scott T. McFarland, 3622 Purple Meadow, Kingwood, Tex. 77345; Miguel A. Perez, 16407 Avenplace Rd., Tomball, Tex. 77375

[21] Appl. No.: 09/071,768

[22] Filed: Apr. 29, 1998

Related U.S. Application Data

[63] Continuation of application No. 08/662,479, Jun. 13, 1996, Pat. No. 5,752,265.

[51] Int. Cl.[7] .......... G06F 12/00

[52] U.S. Cl. .......... 711/147; 711/146; 711/151; 711/119

[58] Field of Search .......... 711/146, 147, 711/145, 126, 133, 131, 103, 151, 119

[56] References Cited

U.S. PATENT DOCUMENTS

| | | | |
|---|---|---|---|
| 5,265,235 | 11/1993 | Sindhu et al. | 395/425 |
| 5,353,415 | 10/1994 | Wolford et al. | 395/325 |
| 5,404,489 | 4/1995 | Woods et al. | 395/425 |
| 5,426,765 | 6/1995 | Stevens et al. | 395/425 |
| 5,463,753 | 10/1995 | Fry et al. | 395/473 |
| 5,511,226 | 4/1996 | Zilka | 395/823 |
| 5,524,212 | 6/1996 | Somani et al. | 395/200.08 |
| 5,526,510 | 6/1996 | Akkary et al. | 395/460 |
| 5,530,932 | 6/1996 | Carmean et al. | 395/750 |
| 5,551,005 | 8/1996 | Sarangdhar et al. | 395/472 |
| 5,553,310 | 9/1996 | Taylor et al. | 395/860 |
| 5,590,310 | 12/1996 | Willenz et al. | 395/473 |
| 5,623,632 | 4/1997 | Liu et al. | 395/471 |
| 5,652,859 | 7/1997 | Mulla et al. | 395/473 |
| 5,659,710 | 8/1997 | Sherman et al. | 711/146 |
| 5,680,572 | 10/1997 | Akkary et al. | 395/453 |
| 5,704,058 | 12/1997 | Derrick et al. | 395/495 |
| 5,715,428 | 2/1998 | Wang et al. | 395/468 |
| 5,717,898 | 2/1998 | Kagan et al. | 395/472 |
| 5,740,400 | 4/1998 | Bowles | 395/471 |
| 5,748,938 | 5/1998 | Kahle | 395/465 |
| 5,751,996 | 5/1998 | Glew et al. | 711/145 |
| 5,752,265 | 5/1998 | Elkhoury et al. | 711/146 |
| 5,809,534 | 9/1998 | Elkhoury | 711/142 |
| 5,809,537 | 9/1998 | Itskin et al. | 711/146 |
| 5,813,036 | 9/1998 | Ghosh et al. | 711/146 |

OTHER PUBLICATIONS

*Pentium® Pro Family Developer's Manual*; vol. 1: Specifications, Chapter 7 "Cache Protocol", pp. 7–1 to 7–3; 1996.

*Pentium® Pro Family Developer's Manual*; vol. 3: *Operating System Writer'sGuide*; Chapter 11 "Memory Cache Control", pp. 11–1 to 11–5; 1996.

*Primary Examiner*—John W. Cabeca
*Assistant Examiner*—Fred F. Tzeng
*Attorney, Agent, or Firm*—Sharp, Comfort & Merrett

[57] ABSTRACT

In a method and system for performing a memory access cycle from a first processor to a memory address in a multi-processor system, the memory access cycle is initiated, and, prior to completion of the memory access cycle, a snoop routine is initiated with respect to the memory address. The memory access cycle is continued without awaiting responses from another one of the processors if a second one of the processors provides a signal which indicates that immediate completion of the memory access cycle will not disturb the integrity of data stored in the system.

24 Claims, 4 Drawing Sheets

PERFORMING A MEMORY ACCESS CYCLE IN A MULTI-PROCESSOR COMPUTER SYSTEM

This Appln is a cont of Ser. No. 08/662,479 filed Jun. 13, 1996, U.S. Pat. No. 5,752,265.

CROSS-REFERENCE TO RELATED APPLICATIONS

This application is related to U.S. patent application Ser. No. 08/662,491, entitled "Performing a Write Cycle to Memory in a Multi-Processor System" and filed on the same day as this application, and U.S. patent application Ser. No. 08/662,480, also filed concurrently with this application, entitled "Performing a Processor-to-Bus Cycle in a Multi-Processor System."

BACKGROUND OF THE INVENTION

The present invention relates to the performance of memory access cycles in a multi-processor computer system.

Many computer systems include multiple processors, such as central processing units (CPUs), which may perform various operations requiring access to a main memory. Examples include reading or writing data from or to the main memory. In these systems, several CPUs may perform operations with respect to data stored in a particular main memory address during the same time interval. Furthermore, a particular CPU may retrieve data from the main memory, modify the retrieved data, and then write the modified data to the specified main memory address.

To enhance the speed capabilities of the system, many computer systems have cache memories associated with the CPUs in addition to the system's main memory. The cache memories are used for the temporary storage of data which the CPUs use during performance of various other operations.

Data is typically transferred between the main memory and the CPUs through one or more buses. A central processor controls access to the bus and determines which CPU or other system component will be given access to the bus at any given time. The central processor thus allows certain cycles involving main memory to be performed before other cycles involving data storage or data retrieval to or from memory are allowed to be performed. One purpose of such priority techniques is to ensure that data stored in the main memory does not become stale. These priority techniques thus help prevent one system component from accessing data in the main memory which was previously modified by another system component but which has not yet returned to the main memory.

SUMMARY OF THE INVENTION

In general, in one aspect, the invention features performing a memory access cycle from a first processor to a memory address in a multi-processor system. The memory access cycle is initiated, and, prior to completion of the memory access cycle, a snoop routine is initiated with respect to the memory address. The memory access cycle is continued without awaiting a response from another one of the processors if a second one of the processors provides a signal which indicates that immediate completion of the memory access cycle will not disturb the integrity of data stored in the system.

Certain implementations of the invention include one or more of the following features. Initiating the snoop routine may include generating a snoop request from a distributed controller. The snoop request may be generated from a distributed controller associated with the first processor. The distributed processor may send the snoop request signal to a central controller on a dedicated line. Signals generated in response to the snoop request may be monitored to determine what states are occupied by respective cache memories associated with the processors. The memory access cycle may be continued without awaiting responses from any other of the processors if the monitoring indicates that one of the cache memories is in a shared state or an exclusive state with respect to the memory address The snoop routine may be terminated if a monitored signal indicates that one of the cache memories is in either a shared or exclusive state with respect to the memory address. Also, for each monitored signal that does not indicate that one of the cache memories is in either a shared or an exclusive state, the snoop routine may be terminated if a monitored signal indicates that one of the cache memories is in a modified state with respect to the memory address. A write back operation with respect to data stored in the cache memory that is in the modified state may be performed prior to continuing the memory access cycle.

Certain implementations of the invention provide one or more of the following advantages. Under specified conditions, performance of the snoop routine may be terminated prior to receiving responses from all processors in the system. Early termination of the snoop routine allows the memory access cycle to continue sooner, thereby achieving a savings in time. The dedicated lines between the distributed controller and the central controller help increase the speed of performance of the snoop routine.

Other features and advantages of the present invention will be more clearly understood upon reading the following description and accompanying drawings and the claims.

DESCRIPTION OF THE PREFERRED EMBODIMENTS

Figure 1:
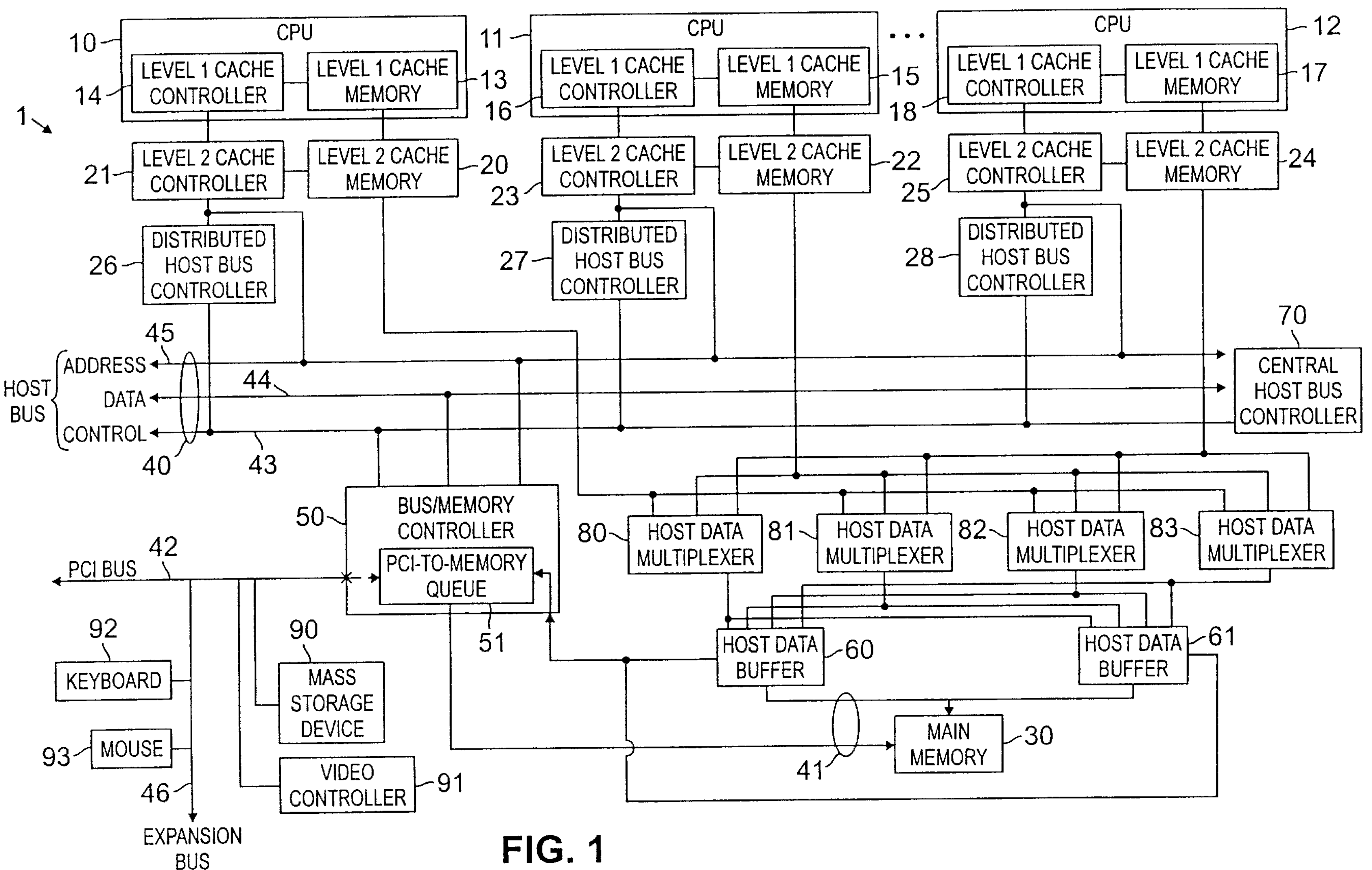
FIG. 1 is a block diagram of a multi-processor computer system.

In FIG. 1, each functional block of a multi-processor system 1 may be implemented, for example, as an integrated chip. The system 1 includes multiple data, address and control buses, including a host bus 40, a memory bus 41 and a peripheral component interface (PCI) bus 42. The host bus 40 includes address, data and control lines 43, 44, 45, respectively. The data lines 44 may be implemented as point-to-point data lines.

The system 1 also includes a mass storage device 90, such as a hard disk controller, and a video controller 91 including a display unit, connected to the PCI bus 42. In addition, an expansion bus 46 is connected to the PCI bus 42. Peripheral devices, such as a keyboard 92 and a mouse 93, are connected to the expansion bus 46.

A bus and memory controller 50 is used in conjunction with a pair of host data buffers 60, 61 to control the flow of data among various buses in the system. The bus and memory controller 50 includes a PCI-to-memory queue 51 which is a content addressable memory and which handles PCI write operations and PCI read operations to and from a main memory 30, respectively. The host data buffers 60, 61 serve as a processor-to-memory queue for data flowing from processors, such as CPUs 10, 11, 12, through host data multiplexers 80, 81, 82, 83, to the main memory 30. The host data buffers 60, 61 perform data ordering for read and write cycles. The host data buffers 60, 61 also allow data to flow between the CPUs 10, 11, 12 and the PCI-to-memory queue 51 in the bus and memory controller 50.

As further shown in FIG. 1, a first level cache memory for storing data and a first level cache controller for controlling the flow of data into and out of the first level cache memory are associated with each of the CPUs 10, 11, 12. Thus, for example, the CPU 10 has a cache memory 13 and a cache controller 14. The CPUs 11, 12 also have cache memories 15, 17 and cache controllers 16, 18, respectively. A second level cache memory and second level cache controller are also associated with each of the respective CPUs 10, 11, 12. Thus, for example, the CPU 10 has a second level cache memory 20 and a second level cache controller 21. Similarly, the CPUs 11, 12 have second level cache memories 22, 24 and second level cache controllers 23, 25, respectively. Data stored in one of the first level cache memories 13, 15, 17 can be transferred to the associated second level cache memory 20, 22 or 24. The cache memories may suitably be implemented, for example, using SRAMs.

The CPUs 10, 11, 12 are capable of performing various read or write operations, including write back and write through operations. When a write through operation is performed, for example, data is written directly to the main memory 30 as well as to the associated level two cache memory. In contrast, a cache which is following a write back protocol does not write the data to the main memory until a write back instruction is received from a central controller 70.

The caches are divided into lines, each of which is associated with one or more main memory addresses. The system 1 is constructed to allow a cache to occupy one of four states with respect to a cache line. First, the cache may be in an invalid state with respect to a cache line. The invalid state indicates that there is no valid data currently stored in the cache with respect to the memory addresses associated with that cache line. Second, the cache may be in a modified state with respect to the cache line, indicating that only the CPU associated with that cache has retrieved and modified data from any of the main memory addresses associated with the cache line. Third, the cache may be in an exclusive state with respect to the cache line, indicating that only the CPU associated with that cache has retrieved data stored in any of the memory addresses associated with the cache line and that the data has not been modified by that CPU. Fourth, the cache may be in a shared state with respect to the cache line, indicating that more than one of the CPUs 10, 11, 12 has retrieved data stored in any of the memory addresses associated with the cache line and that the data currently stored in the cache memories associated with those CPUs is the same. Each of the memory addresses associated with a particular cache line occupies the same state as the cache line.

Logic that resides between the level two cache controllers 21, 23, 25 and the bus and memory controller 50 is split into two sections, the central host bus controller 70 and respective distributed host bus controllers 26, 27, 28. Thus, each of the CPUs 10, 11, 12 has a distributed host bus controller 26, 27 or 28 associated with it.

Each distributed host bus controller 26, 27, 28 functions as an interpreter between its respective level two cache controller 21, 23, 25 and the bus and memory controller 50. The distributed controllers 26, 27, 28 drive various cache controller signals to configure the logical and physical attributes of the respective caches, including, for example, line size, cache size, and data bus width. The distributed controllers 21, 23, 25 also request access to the host bus 40 for various cache controller cycles. Once a specific distributed controller receives access to the host bus 40, it drives the signals on the host address and control lines 43, 45. The distributed controllers 26, 27, 28 perform additional functions as described in greater detail below.

The central host bus controller 70 determines which of the various components of the system 1 will be given access to the host bus 40 during specified time intervals. In particular, the central host bus controller 70 arbitrates between competing requests for access to the host bus 40, according to the principles discussed below.

Figure 2:
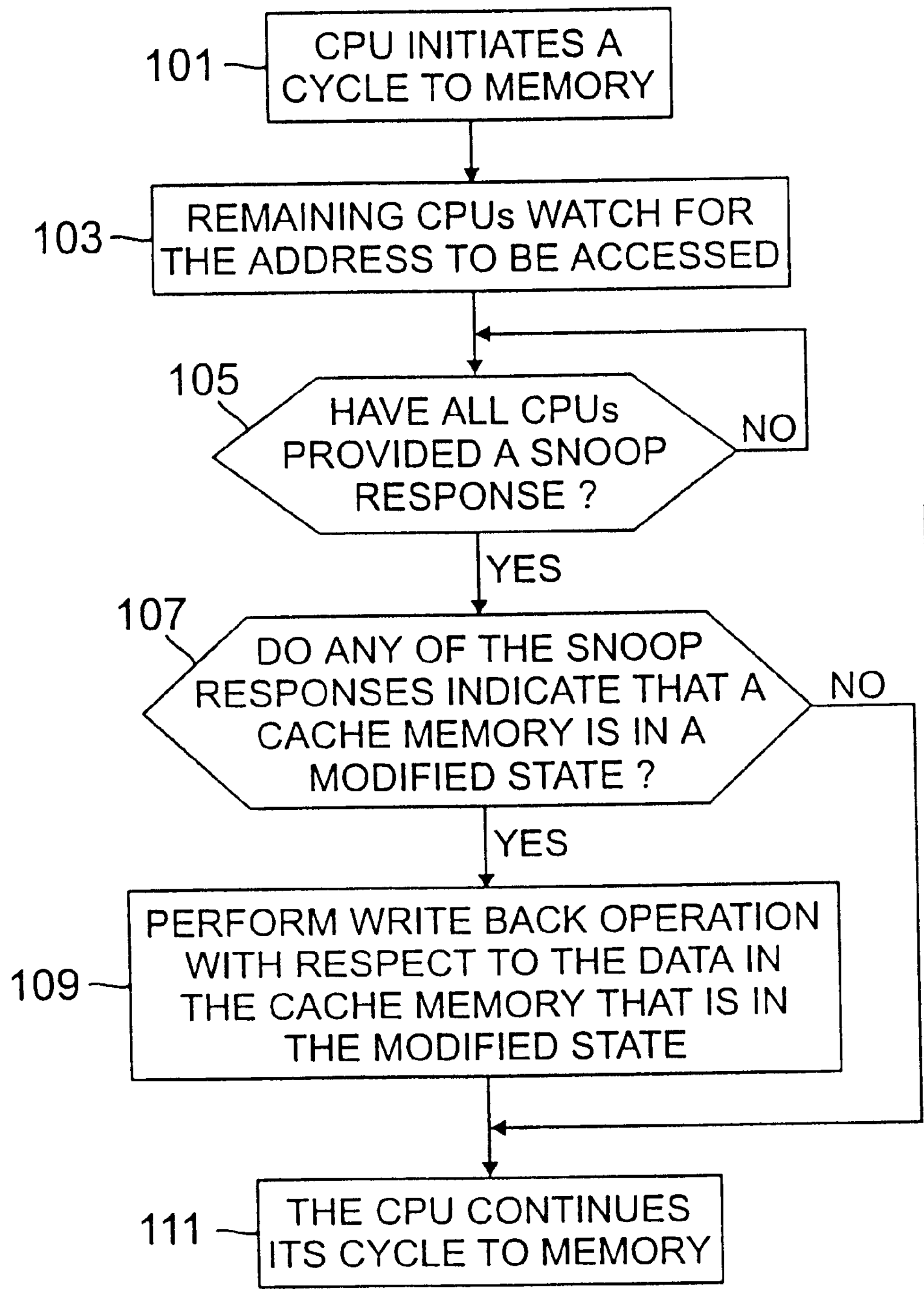
FIG. 2 is a flow chart of one known technique of performing a memory access cycle.

Before discussing the invention further, it is useful to explain how an exemplary known system functions. FIG. 2 illustrates one known technique of performing a read or write cycle with respect to a particular memory address in a multi-processor system. As indicated by step 101, a processor, such as a first CPU, initiates a read or write cycle to the particular memory address. The remaining processors or CPUs continuously snoop or watch for the address which the first CPU is attempting to access, as shown in step 103. In other words, each of the remaining CPUs continuously watches for an indication that the first CPU is attempting to access a particular memory address. When the remaining CPUs detect an attempt by the first CPU to access a particular memory address, each remaining CPU responds by generating a signal, which may be referred to as a snoop response, indicative of the state which its associated cache memory occupies with respect to the particular memory address. As indicated by 105, a central controller receives the snoop responses and determines whether each of the remaining CPUs has provided a snoop response. The central controller waits until snoop responses from all the remaining CPUs are received.

According to the technique shown in FIG. 2, once the central controller determines that all the CPUs have provided snoop responses, a determination is made as to whether any of the snoop responses indicate that one of the cache memories occupies a modified state with respect to the memory address to be accessed, as shown by 107. If the determination is negative, then the first CPU would continue its read or write cycle to memory, as indicated by step 111.

On the other hand, if the central controller determines that one of the snoop responses indicates that a cache memory associated with a second CPU is in a modified state with respect to the memory address to be accessed by the first CPU, then the central controller instructs the second CPU to perform a write back operation. The second CPU would then perform the write back operation, as indicated by step 109. The second CPU would perform the write back operation prior to the first CPU continuing and completing its read or write cycle to memory. In other words, the modified data currently stored in the cache associated with the second CPU would be sent to the processor-to-memory queue before the first CPU reads from or writes to the particular main memory address. In this manner, when the first CPU accesses or modifies data stored in the particular main memory address, for example, the data it accesses or modifies will be current and up to date.

Figure 3:
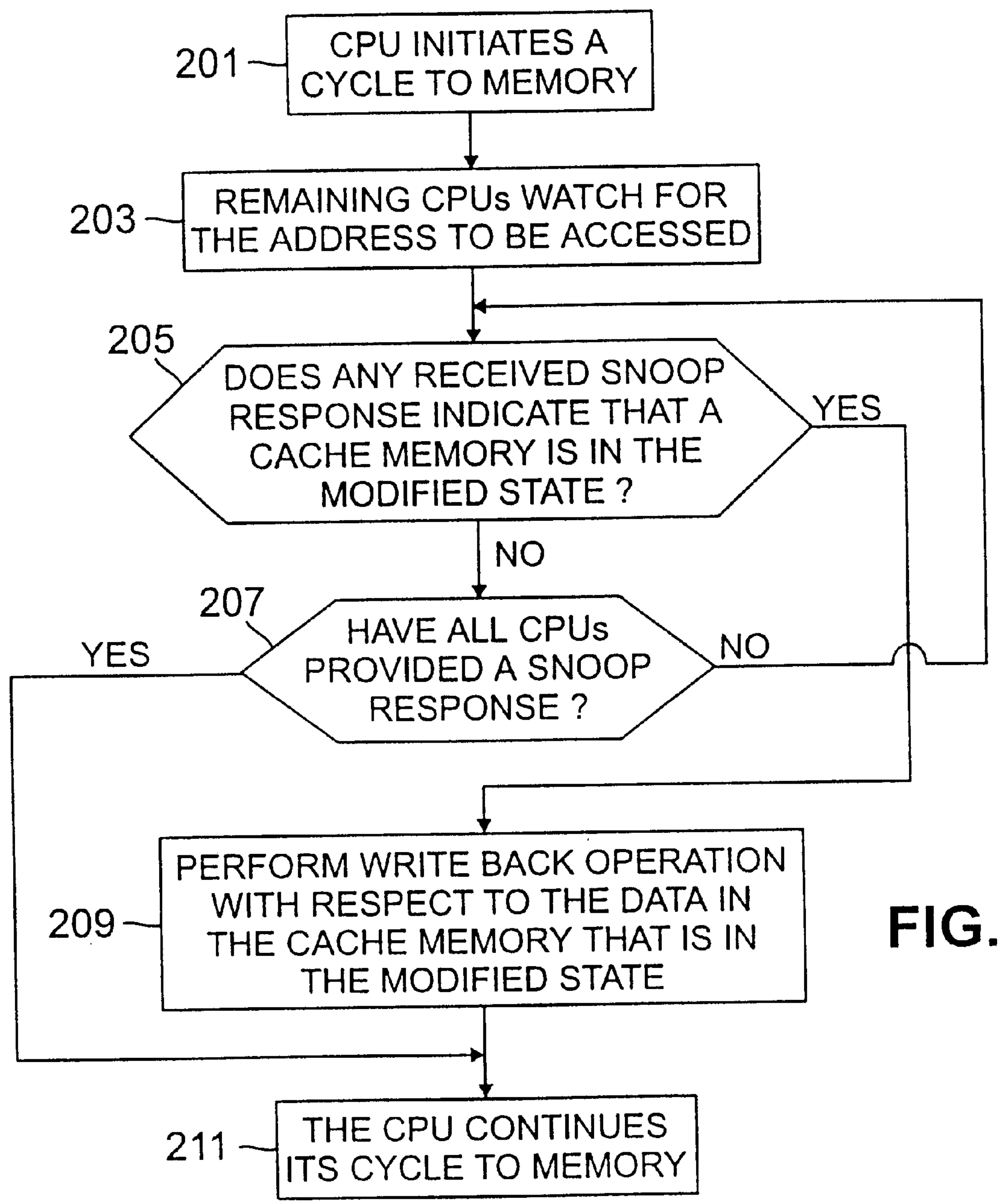
FIG. 3 is a flow chart of another known technique of performing a memory access cycle.

FIG. 3 illustrates another known technique of performing a read or write cycle with respect to a particular memory address in a multi-processor system. As indicated by step 201, a processor, such as a first CPU, initiates a read or write cycle to the particular memory address. The remaining processors or CPUs continuously snoop or watch for the address which the first CPU is attempting to access, as shown in step 203. When the remaining CPUs detect an attempt by the first CPU to access a particular memory address, each remaining CPU responds by generating a snoop response. The central controller receives the snoop responses. As each snoop response is received, the central controller determines in the order they are received, and before all of the rest of the snoop responses have been generated, whether the received snoop response indicates that a cache memory is in a modified state with respect to the memory address to be accessed, as shown by 205.

With respect to the determination 205 in FIG. 3, if the central controller determines that a received snoop response indicates that a cache memory associated with a second CPU is in a modified state with respect to the memory address to be accessed, then the central controller instructs the second CPU to perform a write back operation. The second CPU would then perform the write back operation, as indicated by step 209. The first CPU would then continue and complete its read or write cycle to memory without awaiting the receipt or processing of snoop responses from the additional CPUs.

On the other hand, if the central controller determines that a received snoop response does not indicate that a cache memory associated with a second CPU is in a modified state with respect to the memory address to be accessed, then the processor continues to process snoop responses as they are received. The central controller would continue to process received snoop responses in the manner described until either a response is received indicating that a cache memory is in a modified state with respect to the particular memory address to be accessed or until the processor determines that all the remaining CPUs have provided a snoop response, whichever occurs first, as indicated by 207. If the central controller determines that all the remaining CPUs have provided a snoop response and none of the responses indicate that a cache is in a modified state with respect to the particular memory address, then the first CPU continues and completes its read or write cycle to memory, as indicated by step 211.

Figure 4:
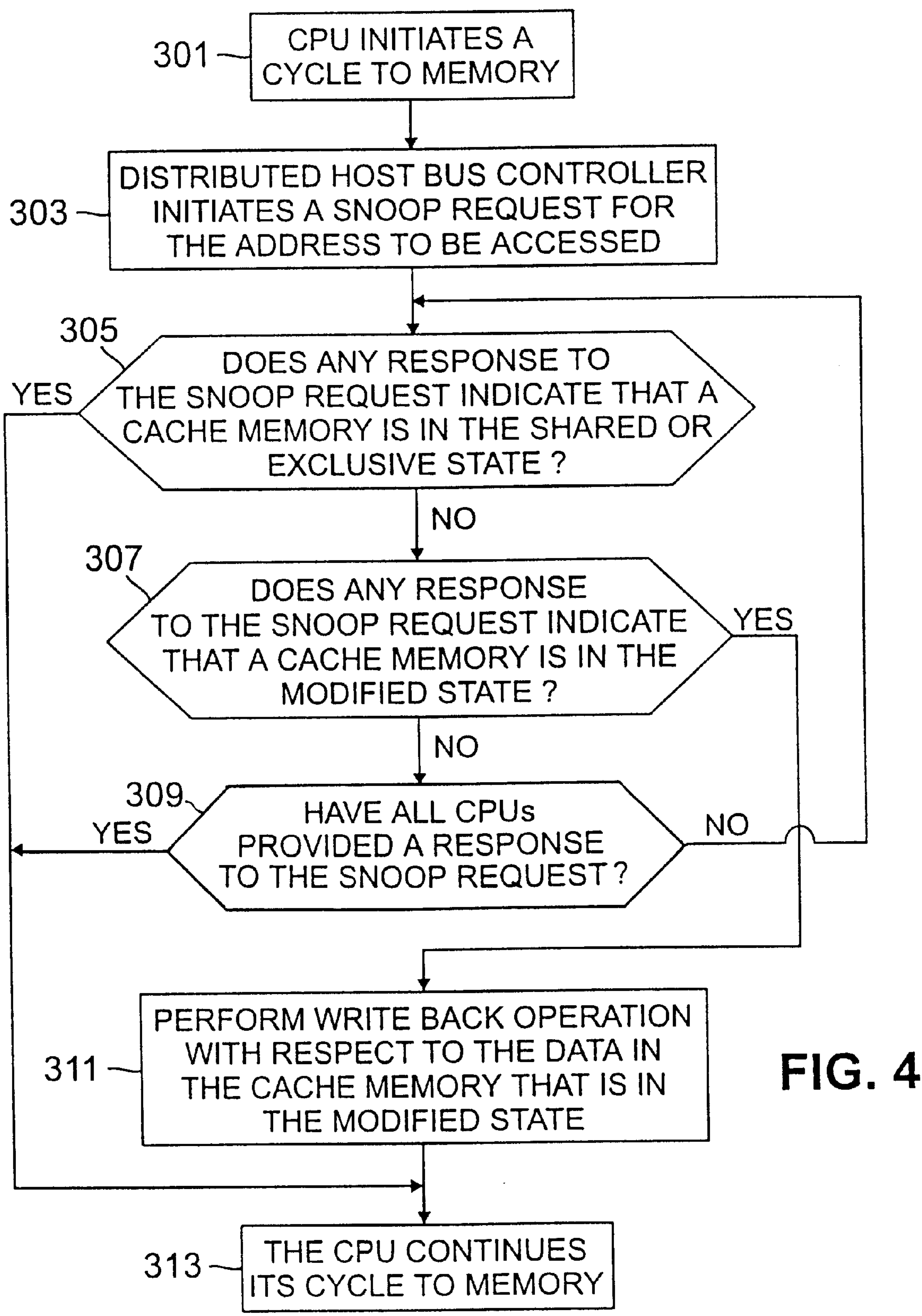
FIG. 4 is a flow chart of a method of performing a memory access cycle according to the invention.

FIG. 4 illustrates a method, according to the present invention, of performing a read or write cycle with respect to data stored in a particular memory address in a multi-processor system. As indicated by step 301, one of the CPUs in the system 1, for example the CPU 10, initiates a read or write cycle, in conjunction with its associated cache memories, to the main memory 30.

The distributed controllers 26, 27, 28 determine if requested cache controller cycles require snoop requests. As mentioned before, a snoop request is a signal which is generated to indicate that a CPU has initiated a read or write cycle with respect to data stored in a specified memory address of the main memory 30.

If a snoop request is required, then the distributed controller that is associated with the CPU initiating the cycle to memory generates a snoop request with respect to the memory address to be accessed, as indicated by step 303. Thus, in this example, the distributed controller 26 generates the appropriate snoop request. The snoop request may be asserted or generated, for example, at the same time that access to the host bus 40 is requested. Furthermore, as shown in FIG. 1, dedicated connections are provided between the distributed host bus controllers 26, 27, 28 and the central host bus controller 70 for sending the bus request and snoop request signals. The dedicated connections help increase the operating speed of the CPU-to-CPU interface with respect to performance of the snoop routine. The central host bus controller 70 forwards the snoop request signal to the other distributed controllers 27, 28, which instruct the associated cache controllers 23, 25 to determine what state each of the associated cache memories 22, 24 occupies with respect to the specified main memory address. First, however, any data stored in the first level cache memories 15, 17 and associated with the specified memory address is transferred to the respective second level cache memory 22 or 24.

Each of the level two cache controllers 23, 25 responds to the snoop request as soon as possible. Each response is forwarded by the respective distributed controller to the central controller 70. The central host bus controller 70 monitors the snoop responses individually in the order they are received to determine the result of the snoop request. In this manner, the central controller 70 determines and controls when to terminate the snoop routine, as further explained below. Once the result is known, it is conveyed to the distributed controller 26. Depending upon the received snoop responses, the snoop routine may be interrupted such that the CPU 10 is allowed to continue its cycle to memory without awaiting snoop responses from CPUs which have not yet responded.

The central controller 70 initially determines whether a received snoop response indicates that a cache memory is in either a shared or exclusive state with respect to the memory address to be accessed, as indicated by 305. If the determination is affirmative, the result is conveyed to the distributed controller 26 which instructs the CPU 10 to continue its cycle to memory without awaiting further snoop responses from other CPUs, as indicated by step 313. In other words, the central controller 70 interrupts the snoop routine and permits the CPU 10 to continue its cycle to memory.

If the central controller 70 determines that the received snoop response does not indicate that a cache is in either a shared or exclusive state with respect to the memory address for which access is requested, then the central controller 70 determines whether the received snoop response indicates that a cache is in a modified state with respect to the memory address to be accessed, as shown by 307. If the central controller 70 determines that the received snoop response indicates that a cache is in a modified state with respect to the memory address to be accessed by the CPU 10, then the result is conveyed to the distributed controller 26. The central controller 70 gives the CPU 11 access to the bus 40, and the CPU 11 performs a write back operation with respect to the modified data stored in the specified memory address, as indicated by step 311. After the CPU 11 completes its write back operation, the distributed controller 26 reacquires the bus 40 so that the CPU 10 can continue and complete its read or write cycle to memory without awaiting further snoop responses, as shown by the step 313.

If the received snoop response indicates that a cache is also not in a modified state, then the controller 70 continues to process snoop responses as they are received according to the determinations 305, 307 in FIG. 4. The central controller 70 continues to process received snoop responses in the manner described until a response is received indicating that a cache is in either a shared or exclusive state with respect to the memory address to be accessed, until a response is received indicating that a cache is in a modified state with respect to the memory address to be accessed, or until the controller 70 determines that all the remaining CPUs have provided a snoop response, as indicated by determinations 305, 307, 309.

If the central controller 70 determines that all the remaining CPUs 11, 12 have provided a snoop response and none of the responses indicates that a cache is in either a shared, an exclusive or a modified state with respect to the memory address to be accessed, then the result is conveyed to the distributed controller 26, and the CPU 10 continues and completes its read or write cycle to memory, as indicated by step 313.

Other embodiments are within the scope of the following claims.

What is claimed is:

1. A computer system comprising:

a plurality of processors;

a shared memory device accessible over a bus by the at least two processors; and a controller operably associated with said plurality of processors for use in connection with performing memory access cycles over said bus from said processors to memory addresses of the shared memory device, the controller operable to perform the operations of:

monitoring signals generated during performance of a snoop routine initiated prior to completion of a memory access cycle from a first one of the processors;

causing the memory access cycle to be continued in response to a monitored signal received from another processor without awaiting responses from any other of the processors if said received signal indicates that immediate completion of the memory access cycle will not disturb the integrity of the data stored in the system.

2. The system of claim 1 wherein the controller is further operable to monitor state signals received from individual cache controllers indicative of the states occupied by respective cache memories associated with the processors.

3. The system of claim 2 wherein the bus controller is further operable to cause the memory access cycle to be continued if one of the monitored signals indicates that one of the cache memories is in a shared state with respect to the memory address.

4. The system of claim 2 wherein the controller is further operable to cause the memory access cycle to continue if one of the monitored signals indicates that one of the cache memories is in an exclusive state with respect to the memory address.

5. The system of claim 2 wherein the controller is further operable to determine whether each monitored signal, as it is received, indicates that one of the cache memories is in either a shared or exclusive state with respect to the memory address and to terminate the snoop routine if the monitored signal indicates that one of the cache memories is in either a shared or exclusive state.

6. The system of claim 1 wherein the controller is programmed to perform the monitoring and causing operations.

7. A computer system comprising:

a plurality of processors;

a shared memory device accessible by at least two processors; and a controller operable in connection with performing memory access cycles from said processors to memory addresses of the shared memory device, the controller comprising:

means for monitoring signals received from said processors generated during performance of a snoop routine initiated by one of said processors prior to completion of the memory access cycle; and means for causing the memory access cycle initiated by said one processor to be continued without awaiting responses from any other of the processors if a second one of the processors provides a signal to said means for monitoring which indicates that immediate completion of the memory access cycle initiated by said one processor will not disturb the integrity of the data stored in the system.

8. A computer system comprising:

a plurality of processors each of which can generate a memory access cycle;

a memory accessible over a host bus by said plurality of processors;

a plurality of distributed host bus controllers each of which is associated with said host bus and with a respective one of the processors each said distributed host controller operable to generate a snoop request in response to specified memory access cycles initiated by the associated processor;

a central controller operable to perform the following operations:

(a) forward a said snoop request to distributed bus controllers of other CPUs and to monitor response signals generated by said distributed bus controllers in response to said forwarded snoop request during performance of the snoop routine initiated prior to completion of the memory access cycle; and (b) cause the memory access cycle to be continued without awaiting response signals from other of the distributed host bus controllers if a second one of the distributed host bus controllers provides a response signal which indicates that immediate completion of the memory access cycle will not disturb the integrity of data stored in the system.

9. The system of claim 8 and further comprising a mass storage device coupled for access by at least one of the processors.

10. The system of claim 8 wherein each distributed host bus controller is operable to generate a snoop request signal when its associated processor initiates one of the specified memory access cycles, wherein the system further comprises a dedicated line for sending the snoop request signal to the central controller.

11. The system of claim 8 wherein the central controller is further operable to monitor signals indicative of the states occupied by respective cache memories associated with the processors.

12. The system of claim 11 wherein the central controller is further operable to cause the memory access cycle to be continued if one of the monitored signals indicates that one of the cache memories is in a shared state with respect to the memory address.

13. The system of claim 11 wherein the central controller is further operable to cause the memory access cycle to be continued if one of the monitored signals indicates that one of the cache memories is in an exclusive state with respect to the memory address.

14. The system of claim 11 wherein the central controller is further operable to determine whether each monitored signal, as it is received, indicates that one of the cache memories is in either a shared or exclusive state with respect to the memory address and to terminate the snoop routine if the monitored signal indicates that one of the cache memories is in either a shared or exclusive state.

15. A computer system comprising:

a plurality of processors each of which can generate a memory access cycle;

a memory accessible over a bus by said plurality of processors;

a plurality of distributed host bus controllers each of which is associated with said bus and with a respective one of the processors and, each said distributed host controllers operable to initiate a snoop routine in response to specified memory access cycles initiated by the associated processor;

a central controller including:

(a) means for monitoring signals generated by said distributed bus controllers during and in response to performance of the snoop routine initiated prior to completion of the memory access cycle; and (b) means for causing the memory access cycle to be continued without awaiting signals from another of the distributed host bus controllers if a second one of the distributed host bus controllers provides a signal which indicates that immediate completion of the memory access cycle will not disturb the integrity of data stored in the system.

16. A method of operating a multi-processor computer system, the method comprising:

(a) initiating a memory access cycle from a first CPU to a memory address of a shared memory device;

(b) initiating a snoop request for the address to be accessed;

(c) at a common location in the multi-processor system, forwarding the snoop request to other CPUs and evaluating a response from a further CPU upon receipt of a response from the further CPU;

(d) performing the memory access cycle if the response from the further CPU indicates that a local cache memory associated with the further CPU is in a shared state or in an exclusive state;

(e) performing a writeback operation with respect to information in the cache memory at the memory address followed by performing the memory access cycle if the response indicates that the local cache memory associated with the further CPU is in a modified state; and (f) repeating steps (c), (d) and (e) for an additional CPU if the response did not indicate that the local cache memory is in a shared state or an exclusive state or a modified state, unless a response from each CPU in the multiprocessor computer system, other than the first CPU, has been evaluated.

17. The method of claim 16 wherein the snoop request is initiated by a distributed host bus controller.

18. The method of claim 17 wherein the distributed host bus controller is associated with the first CPU.

19. The method of claim 17 wherein the response is evaluated at a central controller.

20. The method of claim 16 wherein the memory access cycle is performed if none of the CPUs in the system indicate that a local cache memory is in a shared state or an exclusive state or a modified state.

21. A computer system comprising:

a plurality of CPUs, each CPU including a level 1 cache memory and a level 2 cache memory associated therewith, at least one of the cache memories associated with each CPU being held in a modified, exclusive, shared or invalid state;

a main memory accessible by any of the plurality of CPUs;

each CPU having an associated cache controller operable to initiate a snoop request associated with a main memory access cycle initiated by that CPU;

at least one controller to execute an algorithm during a main memory access cycle, the algorithm including:

forwarding to cache controllers of other CPUs, a snoop request for main memory address to be accessed by a first one of the CPUs; and evaluating responses to said forwarded snoop requests from each of the other CPUs upon receipt from that CPU, wherein the main memory access cycle continues if any of the responses indicate that a cache memory is in the shared or exclusive state or if all of the other CPUs have provided a response to the snoop request and none of the other CPUs have indicated that a cache memory is in the modified state.

22. The system of claim 21 wherein the level 1 cache memory is disposed within the same integrated circuit as its associated CPU.

23. The system of claim 21 and further comprising:

a mass storage device coupled for access by at least one of the CPUs;

a video controller coupled for access by at least one of the CPUs;

a keyboard coupled for access by at least one of the CPUs; and a mouse coupled for access by at least one of the CPUs.

24. A computer system comprising:

a plurality of CPUs, each CPU including a level 1 cache memory and a level 2 cache memory associated therewith, at least one of the cache memories associated with each CPU being held in a modified, exclusive, shared or invalid state;

a main memory accessible by said plurality of CPUs by initiation of a main memory access cycle by a CPU requesting access;

at least one controller commonly associated with said plurality of CPUs which includes means for forwarding to other CPUs a snoop request for a main memory address to be accessed initiated by a first one of the CPUs, and said controller also including means for receiving and evaluating responses from each of the other CPUs upon receipt of a response from that CPU, wherein the main memory access cycle continues if any of the responses indicate that a cache memory is in the shared or exclusive state or if all of the other CPUs have provided a response to the forwarded snoop request and none of the other CPUs have indicated that a cache memory is in the modified state.

* * * * *